United States Patent [19]

Hessian

[11] Patent Number: 5,520,219

[45] Date of Patent: May 28, 1996

[54] REMOVABLE VENT STACK TEST CAP

[76] Inventor: Michael F. Hessian, 14505 Danbury Ave. West, Rosemount, Minn. 55068

[21] Appl. No.: 374,254

[22] Filed: Jan. 18, 1995

[51] Int. Cl.⁶ ............................................... F16L 55/115
[52] U.S. Cl. .......................................... 138/90; 138/96 R
[58] Field of Search ..................... 138/90, 96 R, 138/89.3, 89.4; 220/265, 266, 270, 361, 375, 89.2; 137/68.1

[56]  References Cited

U.S. PATENT DOCUMENTS

| | | | |
|---|---|---|---|
| 1,746,999 | 2/1930 | Gits | 138/89.3 |
| 4,372,585 | 2/1983 | Evora | 138/96 R |
| 4,717,608 | 1/1988 | Meltsch | 138/96 R |
| 4,798,301 | 1/1989 | Bullock et al. | 220/270 |
| 4,899,903 | 2/1990 | Miyasaka et al. | 220/266 |
| 4,903,855 | 2/1990 | Ducay et al. | 220/266 |
| 5,033,510 | 7/1991 | Huber | 138/90 |
| 5,377,361 | 1/1995 | Piskula | 138/90 |
| 5,411,158 | 5/1995 | Kays et al. | 137/68.1 |

Primary Examiner—David Scherbel
Assistant Examiner—James F. Hook
Attorney, Agent, or Firm—Nawrocki, Rooney & Sivertson

[57] ABSTRACT

Apparatus for use in capping a plumbing system vent pipe during testing of the plumbing system. The apparatus includes a capping member for capping the vent pipe which includes a mechanism responsive to force for removal of at least a portion of the capping member by an operator located remote from the plumbing system vent pipe. The plumbing system capping member is highly visible and may be removed from ground level.

9 Claims, 13 Drawing Sheets

REMOVABLE VENT STACK TEST CAP

FIELD OF THE INVENTION

The present invention relates generally to plumbing systems. In particular, the present invention relates to an apparatus for use in capping plumbing system vent pipes during testing of the system. The apparatus may be removed by an operator located at a location remote from the vent pipe.

BACKGROUND OF THE INVENTION

Plumbing codes require that plumbing systems be vented through a plumbing vent pipe extending above the building roof. Additionally, codes require a plumbing system to be pressure tested during rough-in inspections, and that a final manometer plumbing test be performed after the plumbing fixtures have been set in place.

Test caps are used for sealing the plumbing system vent pipe during pressure testing. Once testing is completed, the test cap must be removed so that the plumbing vent pipe may provide adequate venting of the installed plumbing system.

Additionally, some statutes require that all test caps on plumbing vent pipes be visible from ground level. Such laws were enacted to allow an inspector to see if the test cap was in place and to see if the test cap is removed after final plumbing inspections. Failure to remove plumbing vent pipe test caps results in inadequate or no ventilation of the plumbing system.

Many systems exist for capping plumbing roof vents for testing purposes. Such systems include the use of plastic wafers, rubber caps, screw-in expandable plugs, plastic test caps, or the use of inflatable bladders.

The plastic wafer system includes using a solid, thin plastic wafer which is glued over the opening of the plumbing vent pipe. Plastic wafers are prone to cracking in cold weather or exposure to solvents, making them undesirable for plumbing system testing. Additionally, since the wafer is flush with the top of the plumbing vent pipe, it is almost impossible to tell from ground level whether the wafer has been removed. In order to remove or inspect the plastic wafer, one must climb up onto the building roof. Additionally, during removal of the test wafer, the wafer is susceptible to falling into the plumbing vent, which may result in plugging the vent.

The rubber cap system includes a rubber cap that fits over the end of the plumbing vent pipe and is secured to the plumbing vent pipe by a radiator-type clamp. After testing is completed, the only way to remove the cap is by climbing onto the roof and mechanically removing the cap by means of a screwdriver or similar tool. Additional construction problems exist in installing roof flashing around plumbing vent pipes without breaking the rubber caps.

Similar to the rubber cap system, the expandable plug system is also mechanically secured over the plumbing vent pipe. After testing, the plumber must climb onto the roof to remove the expandable plug, to unscrew it either by hand or with pliers.

The plastic test cap system includes gluing a plastic test plug or vent cap over the plumbing vent pipe. Again, in order to remove the test cap, the plumber must climb onto the building roof and saw it off.

An inflatable bladder system includes locating the inflatable bladder in a plumbing clean-out located in the building attic, and then subsequently removing it after testing. Often times this method requires a plumber to climb a ladder into a restricted attic space resulting in damaged attic insulation and additional time expended in removal of the inflatable bladder and clean-up of insulation. Additionally, there are possibilities that the plumber may forget to screw the clean-out plug into the clean-out after removal of the inflatable bladder, allowing sewer gases to escape into the house.

The present invention is an apparatus for use in capping a plumbing system vent pipe during the pressure testing of the plumbing system. The present invention allows for easy removal of the apparatus after a completed inspection, while not requiring a plumber to climb onto the building roof to remove the apparatus. Additionally, the apparatus is highly visible from ground level to verify removal of the capping apparatus.

SUMMARY OF THE INVENTION

The present invention relates generally to plumbing systems. In particular, the present invention includes an apparatus for use in capping plumbing system vent pipes during testing of the plumbing system, which may be removable by an operator located at a location remote from the vent pipe.

The present invention includes a capping member for capping the vent pipe, wherein the capping member includes means responsive to force for removal of at least a portion of the capping member. Means can also be provided for preventing the removed portion of the capping member from falling into the vent pipe. Additionally, means can be provided for securing an object remote from the capping member to the capping member for transmitting the force for removal of at least a portion of the capping member.

In one embodiment, the capping member includes a top portion and a bottom portion connected together by the means responsive to force. The bottom portion may be at least partially inserted in or over the vent pipe opening and secured to the vent pipe such as by an adhesive or glue. When a force is applied to the top portion, the means responsive to force separates the top portion from the bottom portion, breaking away the top portion. In a preferred embodiment, the means responsive to force includes a generally cylindrically shaped wall having a smaller thickness or annular score between the top portion and bottom portion wall members.

The present invention may also include means for removing at least a portion of the capping member from a location separate from the roof. The means for removing may include an extension tool. In one embodiment, the means for removing includes a pole carrying, at one end thereof, a wire loop. In another embodiment, the extension means can include a plurality of tubular members threaded together end-to-end to reach a desired height, or a telescoping pole for reaching the height of the roof vent.

BRIEF DESCRIPTION OF THE DRAWINGS

The invention will be further described with reference to accompanying drawings where like numbers refer to like parts in several views, and wherein.

DETAILED DESCRIPTION OF THE PREFERRED EMBODIMENTS

Building codes require that plumbing systems be vented through a plumbing vent pipe extending above the building roof. Additionally, plumbing codes require a plumbing system be pressure tested after installation. In order to test the plumbing system, test caps are used for sealing the plumbing system vent pipe during pressure testing. Once testing is complete, the test cad is removed, restoring ventilation to the plumbing system.

The present invention relates to an apparatus for use in capping plumbing system vent pipes during testing of the plumbing system, which may be removable by an operator located at a location remote from the vent pipe.

Figure 1:
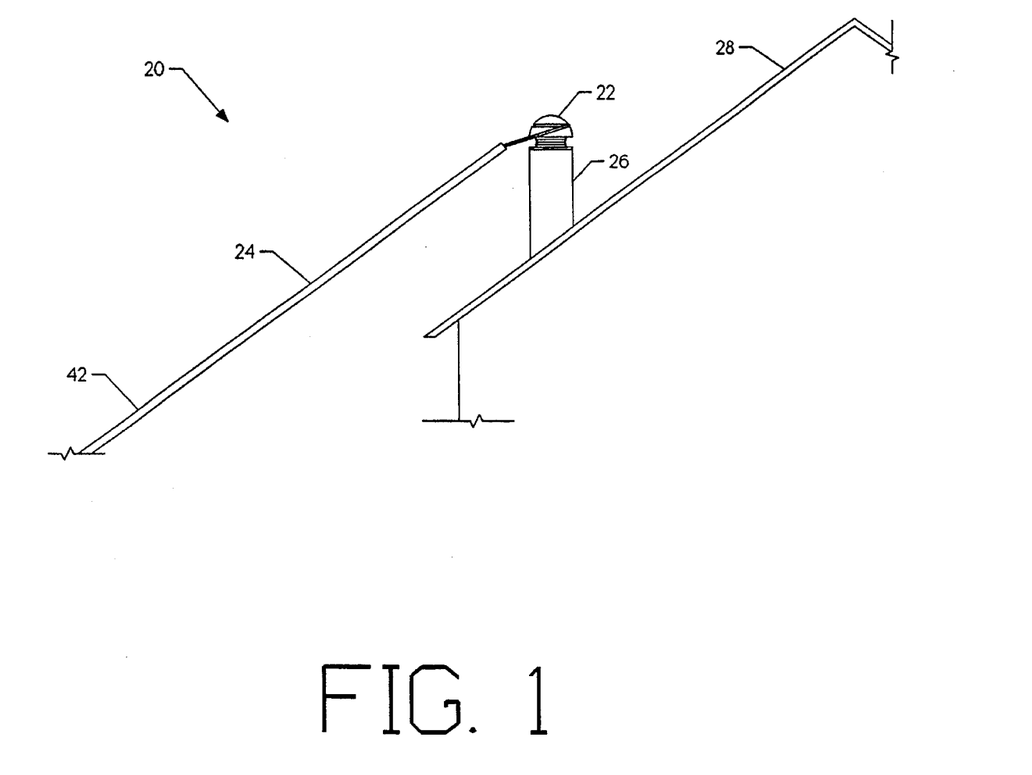
FIG. 1 is a side elevational view of the plumbing system and testing apparatus of the present invention.

FIG. 1 shows a plumbing test system generally at 20. The plumbing test system 20 includes a test cap 22 and a cap remover 24. Test cad 22 functions to seal the opening of plumbing system vent pipe 26, which extends through roof 28, during pressure testing of the building plumbing system.

Test cap 22 is secured to the top of plumbing system vent pipe 26. After testing of the plumbing system has been completed, cap remover 24 allows a person remote from the plumbing system vent pipe 26 to engage the test cap 22 and cause a top portion of the test cap 22 to break away flush with the top of the plumbing system vent pipe 26. The break away feature of the test cap 22 allows a plumber to remove a portion of the test cap 22 from the plumbing system vent pipe 26 opening, from ground level, restoring ventilation to the plumbing system. Operation and embodiments of the test cap 22 and cap remover 24 are described in detail hereinafter.

Figure 2:
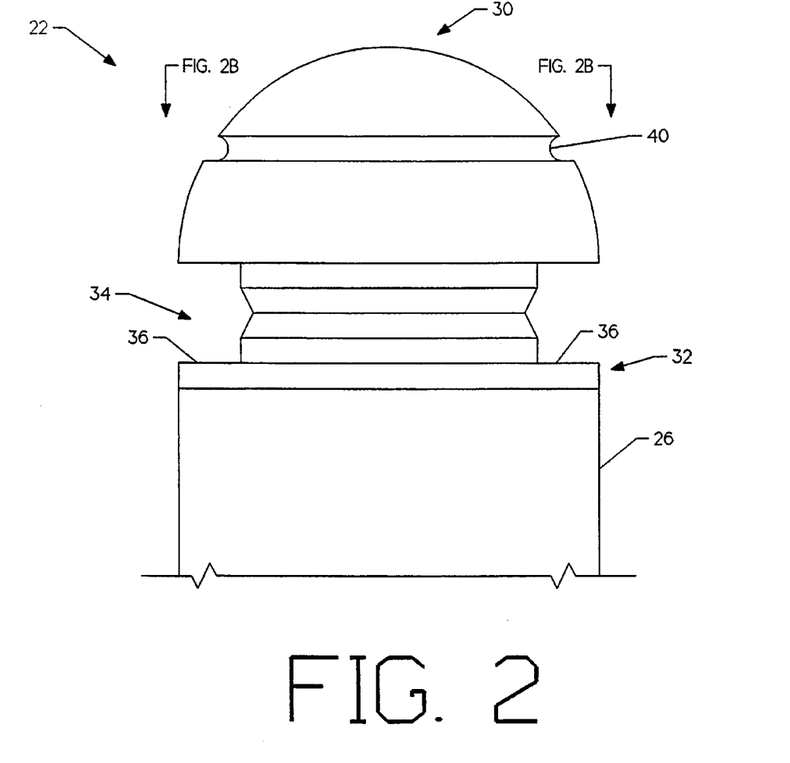
FIG. 2 is an enlarged side elevational view of the plumbing system testing apparatus cap member shown in FIG. 1 installed in a plumbing system vent pipe.
Figure 2A:
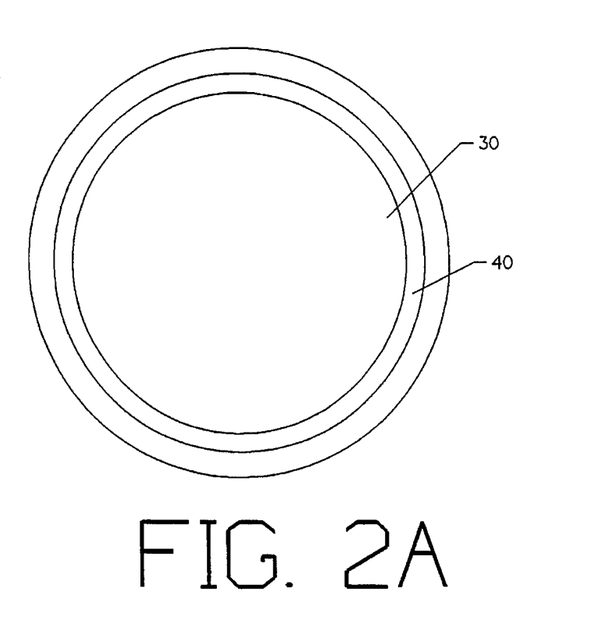
FIG. 2A is a top view of the plumbing system testing apparatus shown in FIG. 2.
Figure 2B:
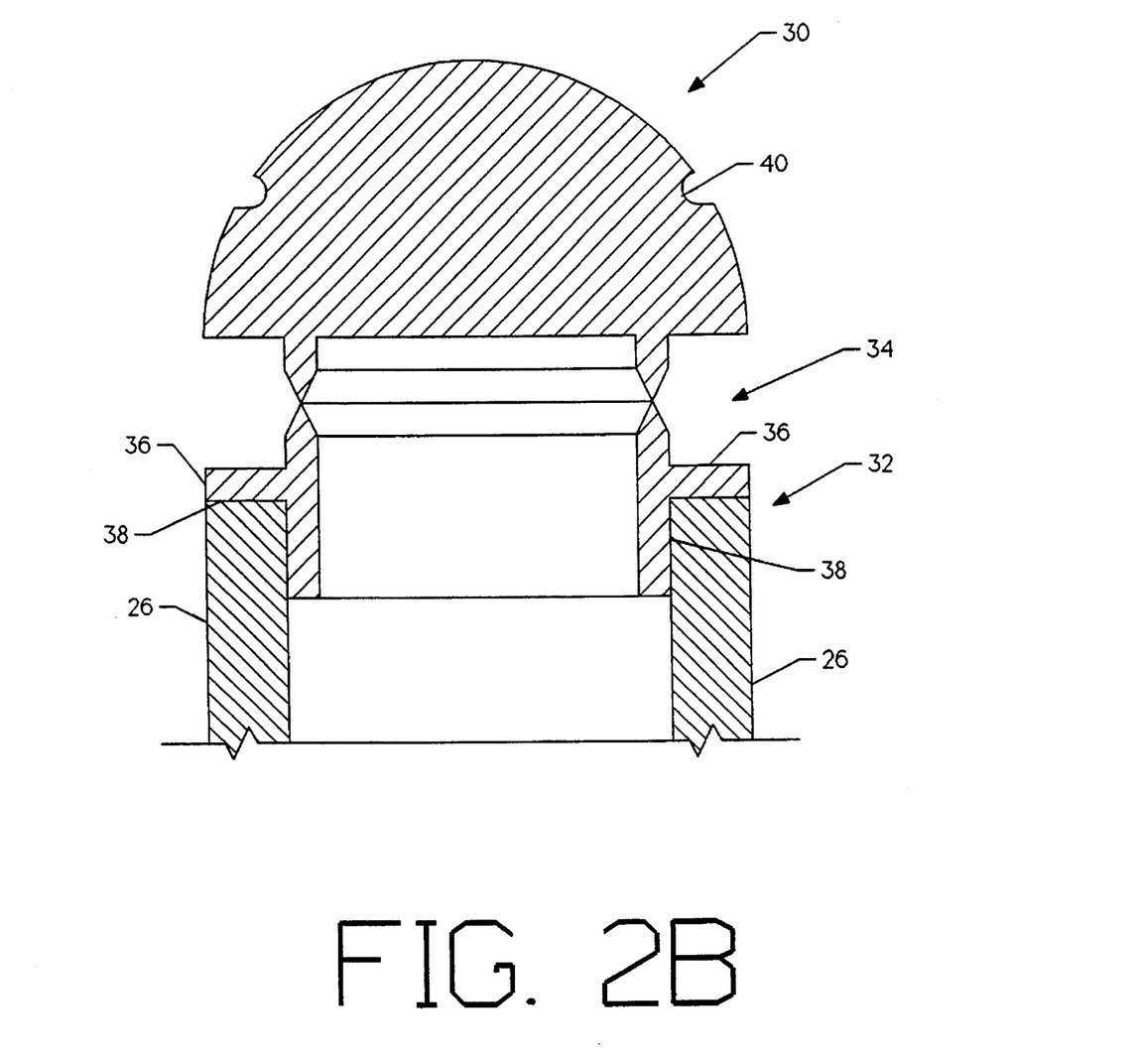
FIG. 2B is a side sectional view of the plumbing system testing apparatus shown in FIG. 2.

A side elevational view of the test cap 22 is shown in FIG. 2, with a top view of the test cap 22 shown in FIG. 2A, and a sectional view shown in FIG. 2B. The test cap 22 is shown inserted into a plumbing system vent pipe 26.

In one embodiment, the test cap 22 includes a top portion 30 and a bottom portion 32 connected by a break away or frangible portion 34. The test cap 22 is preferably formed of a hard plastic, although it is recognized that it may be formed of other materials used in the plumbing industry.

Figure 2C:
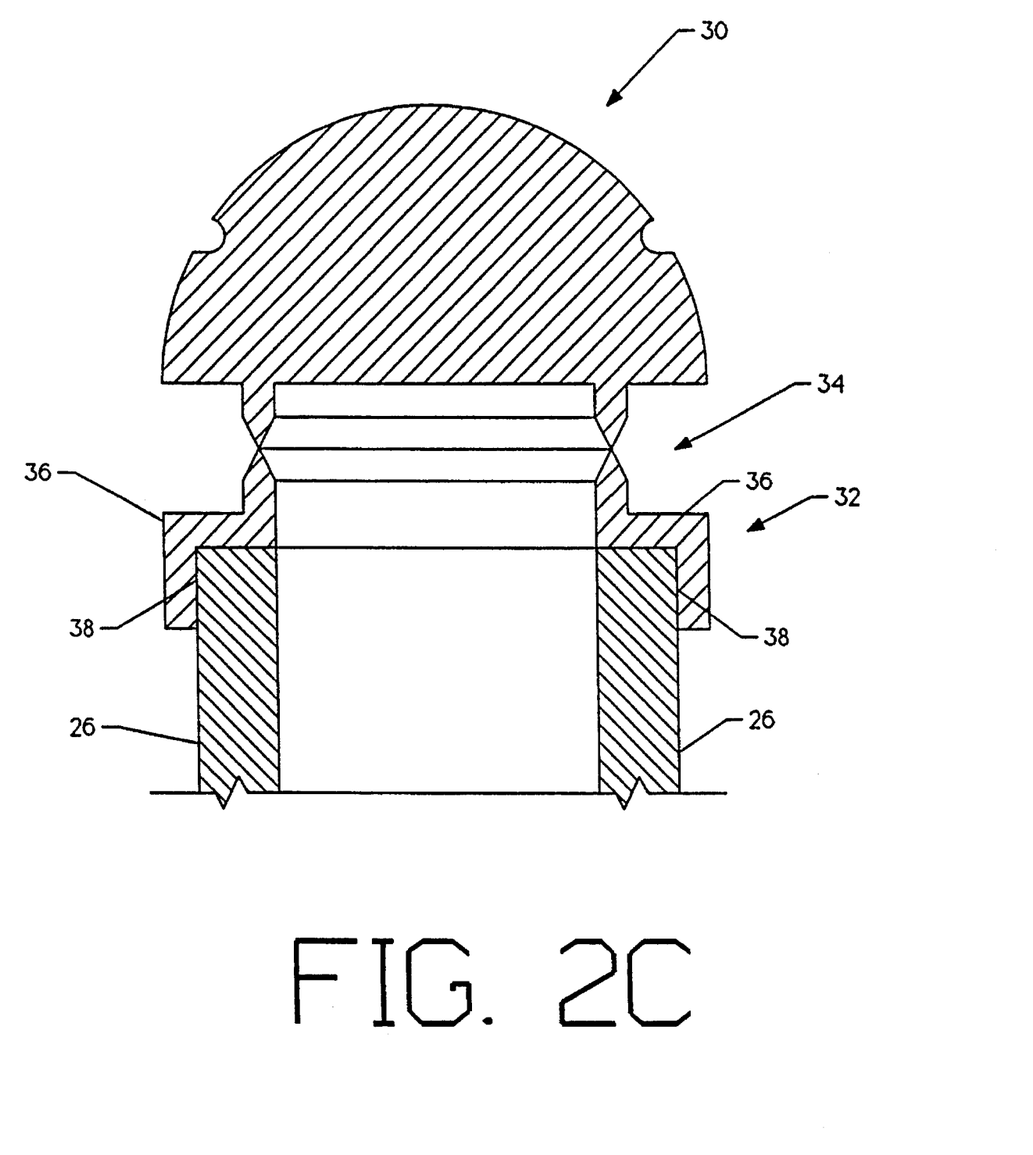
FIG. 2C is a cross-sectional view showing an alternative embodiment of the plumbing system testing apparatus cap member shown in FIG. 2.

As shown in FIG. 2B, bottom portion 32 is formed to fit within plumbing system vent pipe 26, sealing the vent pipe 26 opening. Additionally, test cap 22 includes a flange 36 for seating test cap 22 on top of plumbing system vent pipe 26. Bottom portion 32 is secured to vent pipe 26 by any acceptable known methods, such as the use of adhesives or glue at locations indicated at 38. It is recognized that test cap 22 bottom portion 32 may be inserted within vent pipe 26, as indicated in FIG. 2B, or alternatively, test cap 22 may be positioned over vent pipe 26, shown in the alternative embodiment of FIG. 2C.

Referring to FIGS. 1 and 2, in one embodiment top portion 30 is generally dome shaped and includes a score or groove 40 which encircles the frangible portion 34 of test cap 22. The top portion 30 is preferably formed of a heavy plastic, such that it does not crack or break due from exposure to weather.

Figure 3:
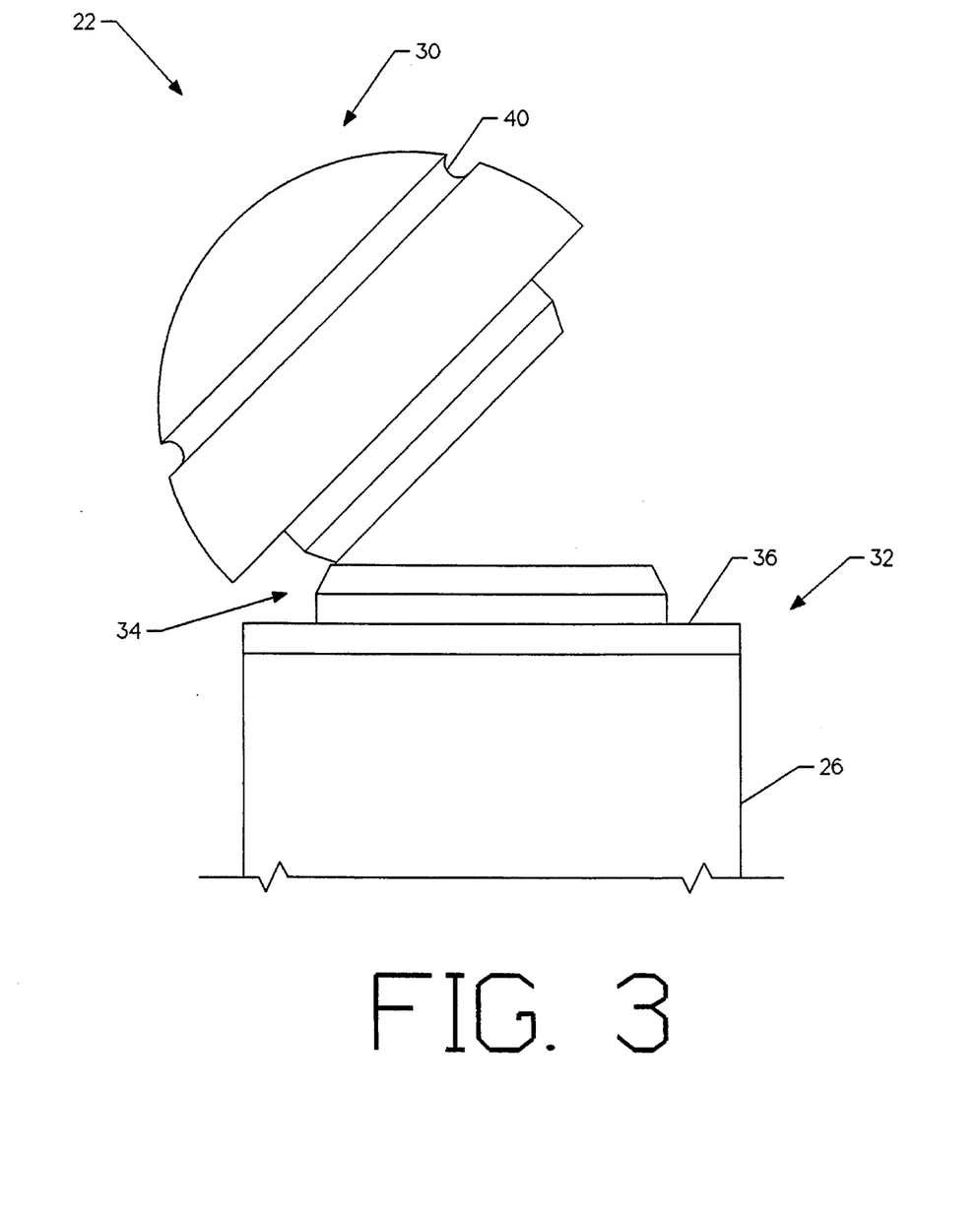
FIG. 3 is a side elevational view of the plumbing system testing apparatus cap member shown in FIG. 1 with a portion of the cap member removed.

Groove 40 allows cap remover 24 to securely engage or capture the top portion 30 of test cap 22 for removal of the top portion 30 from the bottom portion 32 at break away portion 34. Break away portion 34 connects top portion 30 with bottom portion 32. The break away portion 34 is defined by a thin plastic, relative to top and bottom portions 30 and 32. After pressure testing has been completed, by engaging groove 40 with test cap remover 24 and pulling on cap remover 24, the top portion 30 of test cap 22 easily breaks away from the bottom portion 32, restoring ventilation to the plumbing system 26. A broken away view of test cap 22 is shown in FIG. 3. As one will observe, test cap 22 will not fall into vent pipe 26 after removal.

The test cap 22 top portion 30 is domed shaped so that it will not be easily damaged by construction equipment. The dome shape also allows roofing equipment, such as an air hose, to slide over the test cap 22 without damaging or breaking off the test cap 22. The air hose also passes easily over the groove 40 which is preferably smaller in diameter than the hose. Additionally, plumbing system vent pipe 26 roof flashing will slide easily over the dome shaped test cap 22, causing no damage to the roof flashing. The dome shaped test cap 22 will also not allow items, such as shingles, wall boxes, or other equipment to be set on it for use as a work bench by roofers, carpenters, or other construction workers.

The seal between the test cap 22 and the plumping system vent pipe 26 will not be broken during pressure testing of the plumbing system.

The test cap 22 is easily removed from the plumbing system vent pipe 26 after testing has been completed using cap remover 24. Cap remover 24 allows a person remote from the plumbing system vent pipe 26 to remove the top portion 30 of test cap 22. Cap remover 24 allows a person at ground level to remove the top portion 30 of test cap 22 without climbing onto the building roof 28. The use of cap remover 24 eliminates the additional work of climbing onto a roof, and the possibility of a person falling while climbing onto the building roof 28 to remove the top portion 30 of test cap 22.

Figure 4:
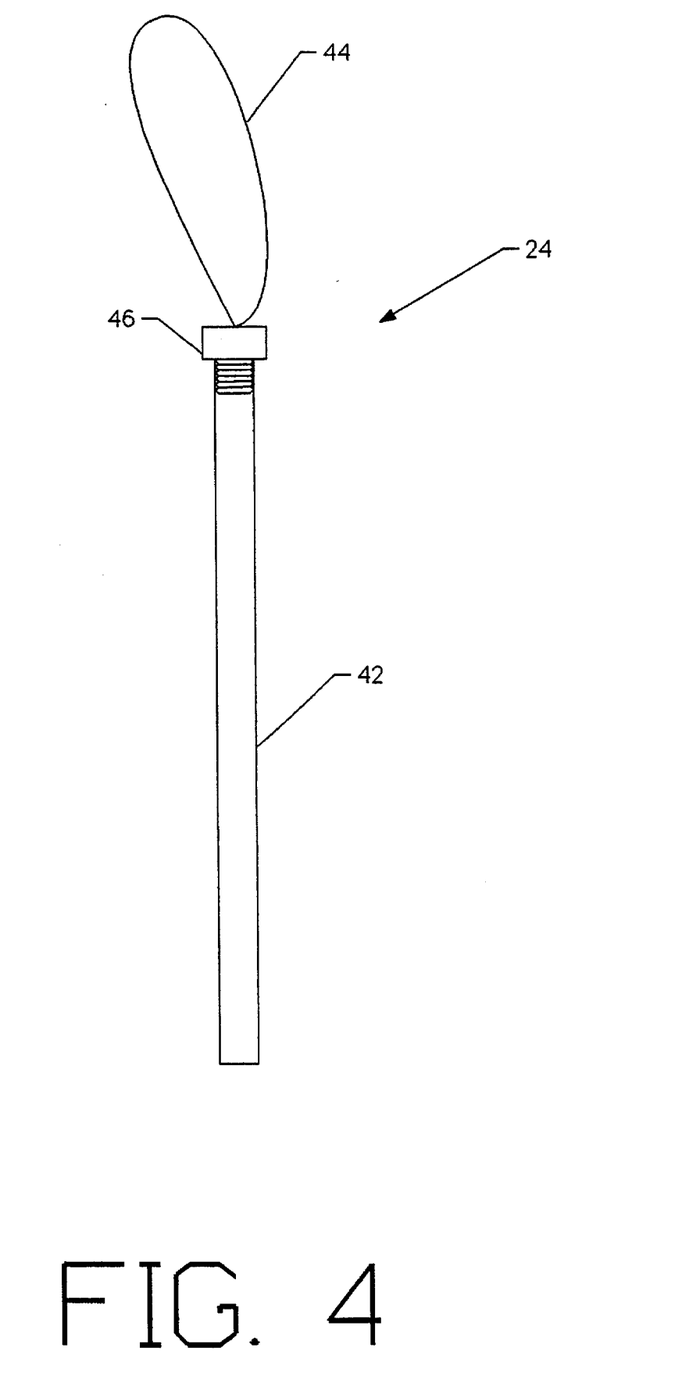
FIG. 4 is a side elevational view of an embodiment of the plumbing testing apparatus removal device shown in FIG. 1.

In one embodiment, the cap remover 24 includes an extension pole 42 and a wire cap remover 44, as shown in FIG. 1 and detailed in FIG. 4. The extension pole 42 may be formed of any suitable material, such as wood, plastic, or copper plumbing pipe. Alternatively, it is recognized that the extension pole 42 may be alternately configured while still remaining within the scope of the present invention.

Figure 5A:
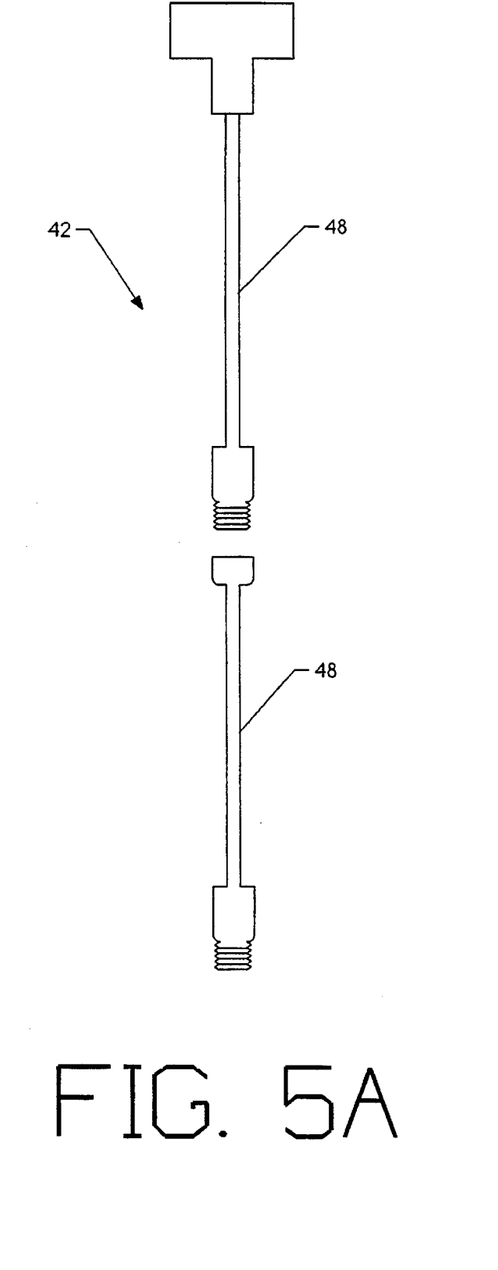
FIG. 5A is a side elevational view of an embodiment of the plumbing system testing apparatus removal device extension member shown in FIG. 1.
Figure 5B:
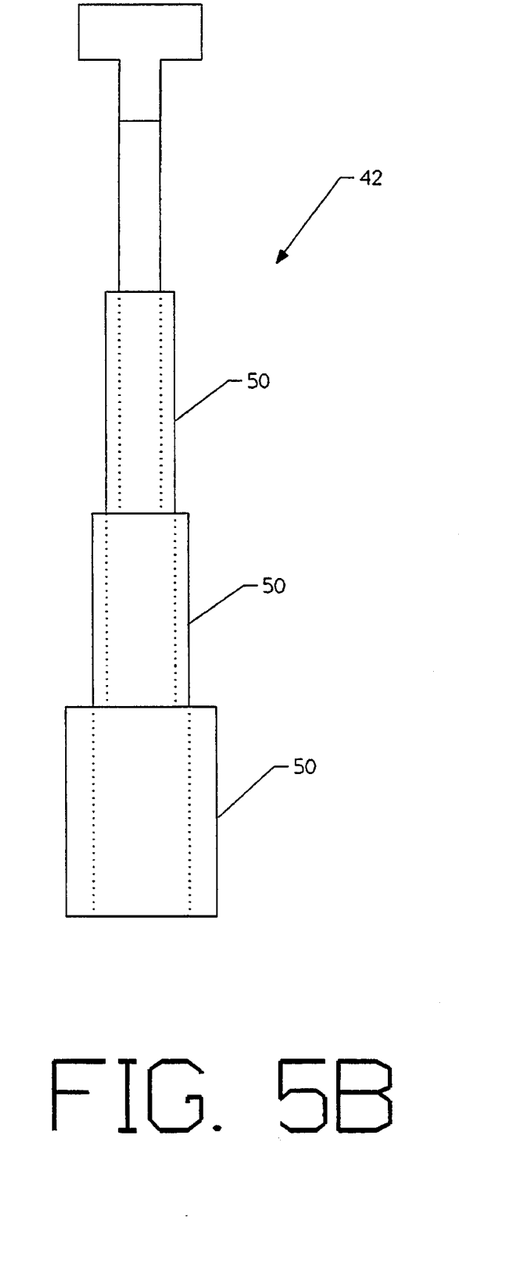
FIG. 5B is a side elevational view of an alternative embodiment of the plumbing system testing apparatus removal device extension member shown in FIG. 1.

FIG. 5A shows an extension pole 42 which may be extended by screwing a desired number of extension members 48 together to reach the height of the test cap 22 located on the top of the plumbing system vent pipe 26. FIG. 5B shows an extension pole 42 which may be extended to the desired length using telescope-like sections 50. By using a solid pole, a plurality of extension members 48, or telescope sections 50, the extension pole 42 may be extended to the desired height to reach the test cap 22 without climbing onto the building roof.

Cap remover 24 may also include a mechanism 46 for combining desired cap removal ends 44 with extension poles 42. It is recognized that different methods may be used for engaging the top portion 30 of test cap 22 for breaking away the top portion 30 from the bottom portion 32.

Figure 6A:
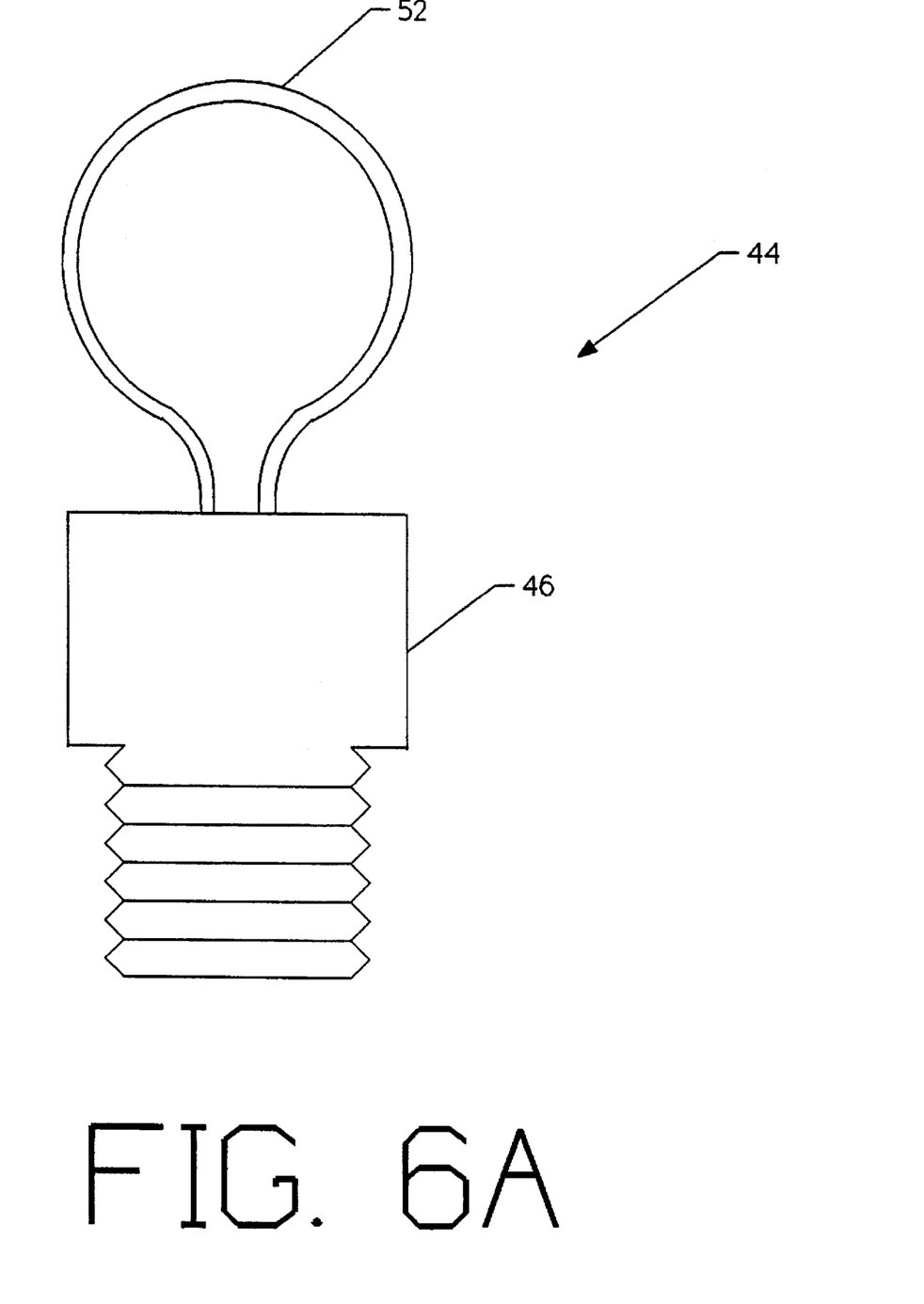
FIG. 6A is a side elevational view of a plumbing system testing apparatus connection device.
Figure 6B:
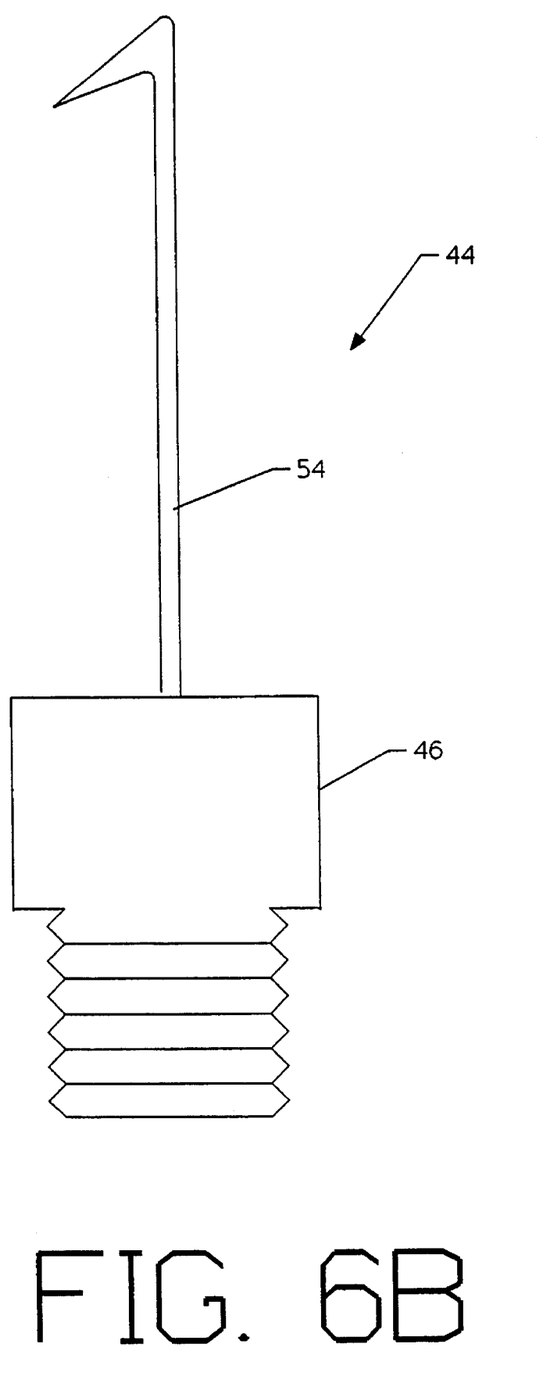
FIG. 6B is a side elevational view of an alternative plumbing system testing apparatus connection device.
Figure 7A:
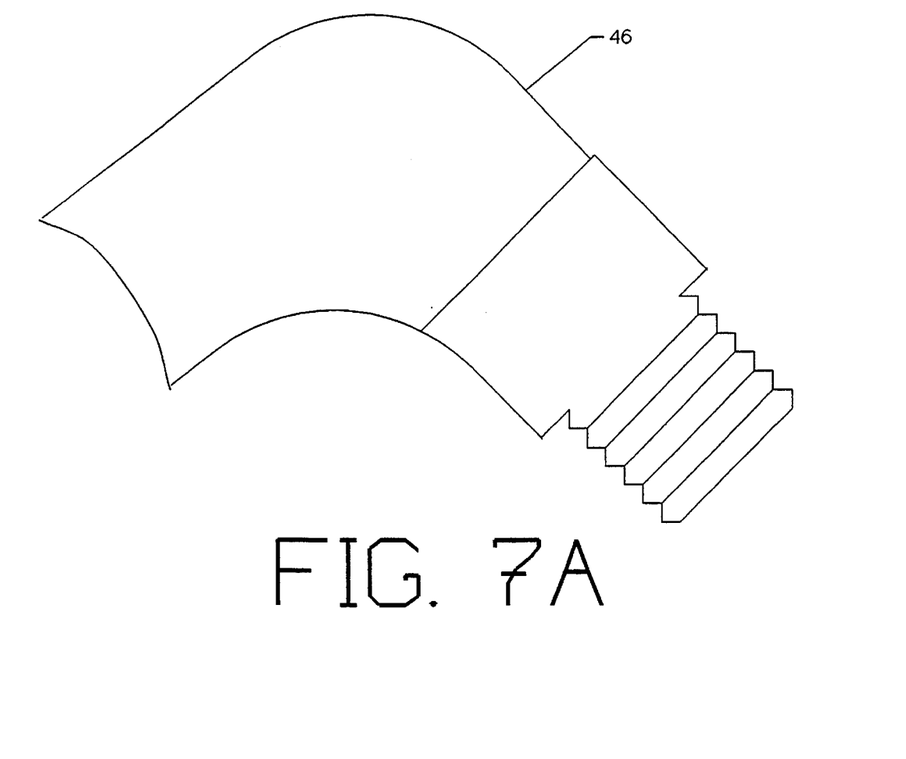
FIG. 7A is a side elevational view of a plumbing system testing apparatus extension member fixture.
Figure 7B:
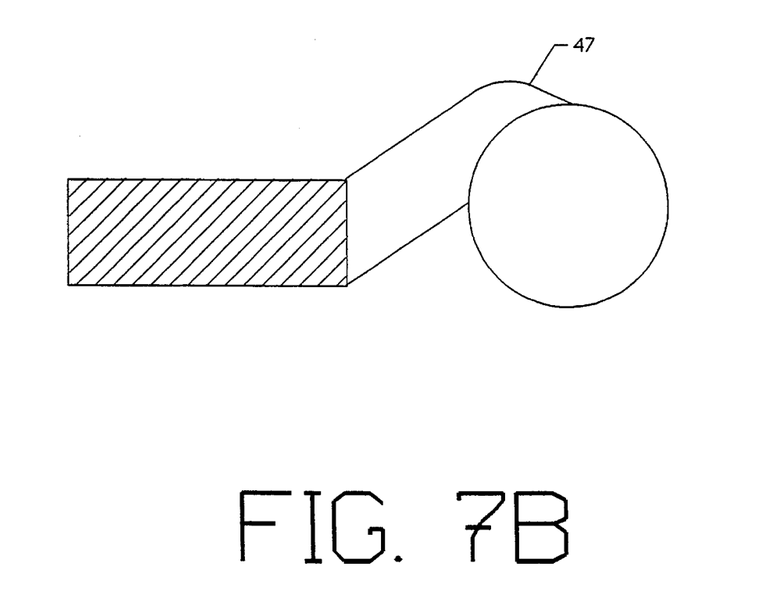
FIG. 7B is a side elevational view of an alternative plumbing system testing apparatus extension member fixture.

FIG. 6A shows a cap removal end 44 having a mechanism 46 attached to a small wire or cable loop 52. FIG. 6B shows a cap removal end 44 including a mechanism 46 attached to a hook 54. Alternatively, a curved mechanism 46, as shown in FIG. 7A, may be attached to a cap removal end 44, or may be configured similar to a fuel filter removal clamp 47, as shown in FIG. 7B.

Figure 8A:
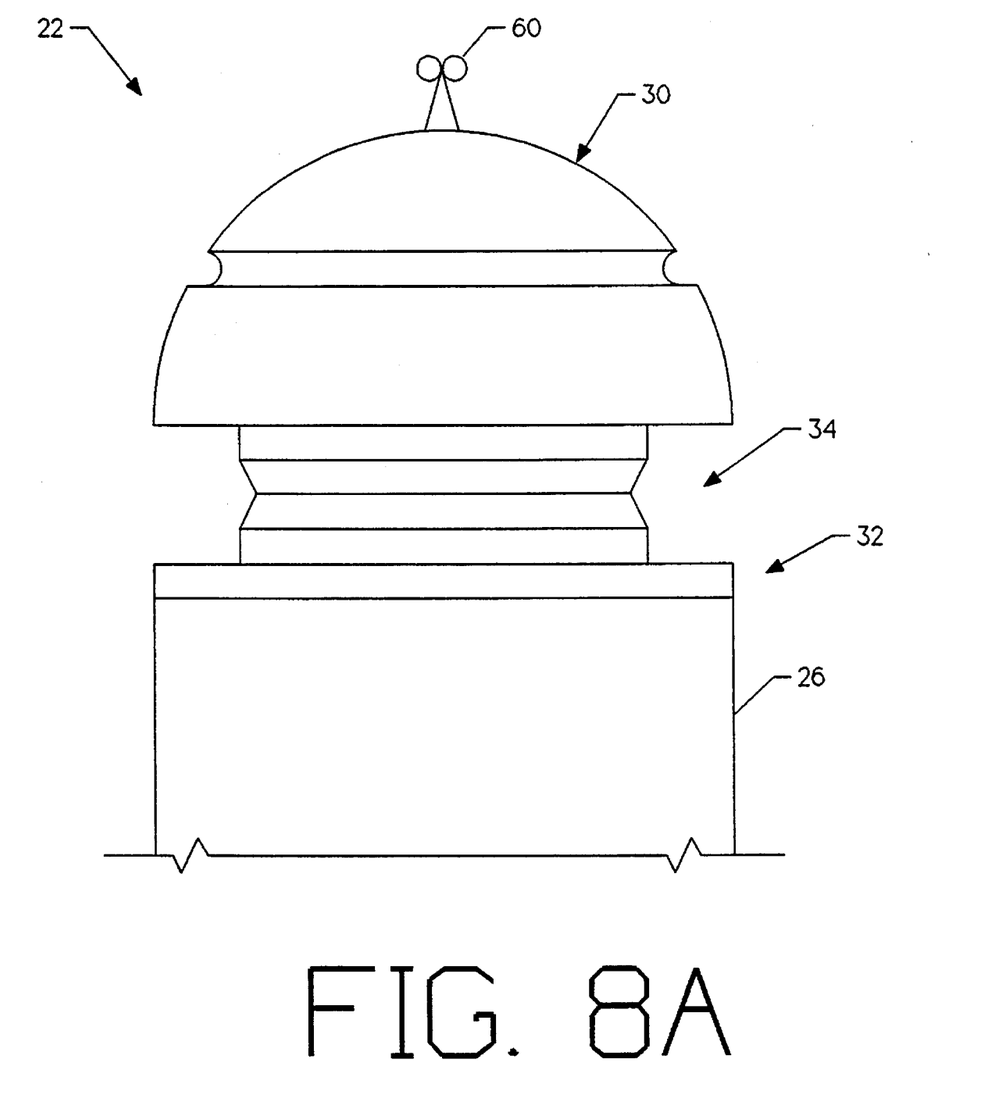
FIG. 8A is an alternative embodiment of the plumbing system testing apparatus cap member shown in FIG. 2.
Figure 8B:
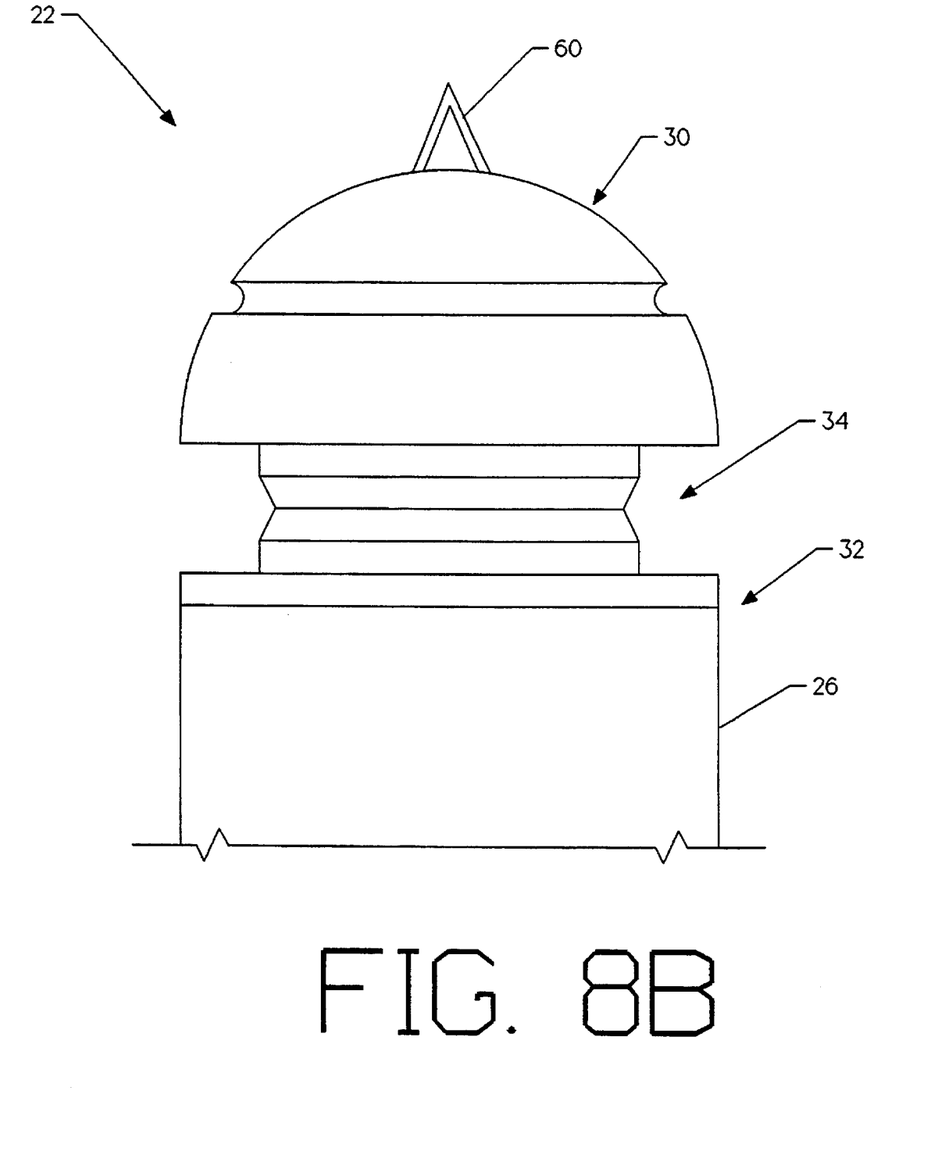
FIG. 8B is an alternative embodiment of the plumbing system testing apparatus cap member shown in FIG. 2.
Figure 8C:
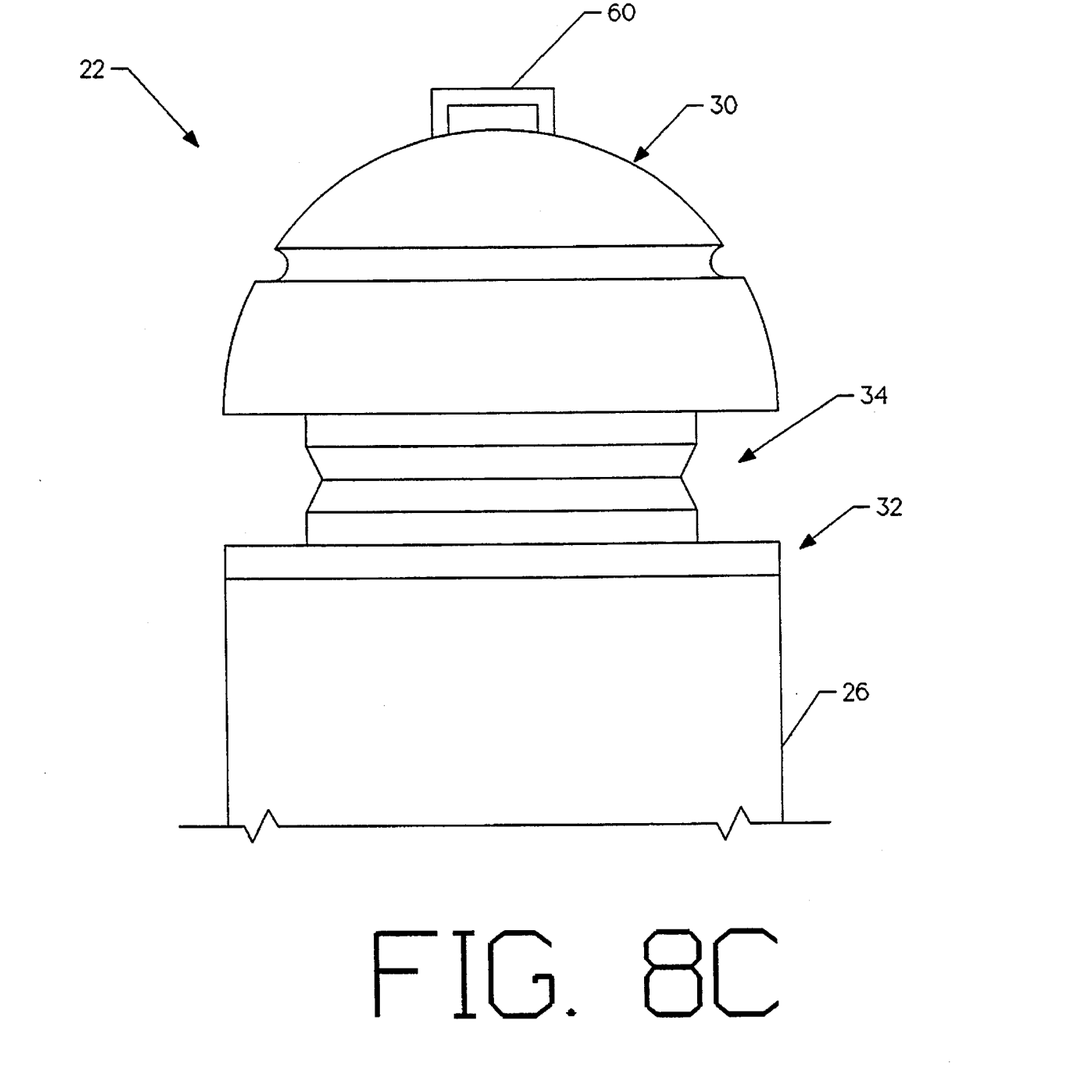
FIG. 8C is an alternative embodiment of the plumbing system testing apparatus cap member shown in FIG. 2.

Additionally, it is recognized that test cap 22 may be alternately configured to adapt to various cap removers, while still remaining within the scope of the present invention, as indicated at 60 in FIGS. 8A, 8B, and 8C. In each embodiment, the top portion of test cap 22 may be removed using a cap remover 24 by an operator located at ground level, for breaking away top portion 30 from bottom portion 32 after pressure testing has been completed. It is also recognized that the novel break away test cap 22 top portion 30 may be removed by other forces, such as striking it with a hammer.

Often, it is hard to tell whether a test cap has been removed from the plumbing vent pipe after completion of the plumbing system pressure testing. Failure to remove a plumbing test cap results in inadequate or no ventilation of the plumbing system. With the present invention, it is recognized that the top portion 30 of test cap 22 may be brightly colored, such as orange or red so it is easily visible by an operator located at ground level. The bottom portion 32 could be of a color similar to vent pipe 26. Consequently, a plumber or plumbing inspector can easily tell from ground level whether the test cap 22 has been removed, since only top portion 30 is of a bright color. After removal of the top portion 30, ventilation is restored to the plumbing system, and bottom portion 32 is not visible from ground level.

It will be understood that this disclosure is, in many respects, only illustrative. Changes may be made in details, particularly in matters of shape, size, material, and arrangement of parts without exceeding the scope of the invention. It is recognized that the removable test cap 22 of the present invention may take on many different shapes and sizes, while retaining the novel breakaway feature of the present invention. Accordingly, the scope of the invention is as defined in the language of the appended claims.

What is claimed is:

1. Apparatus for sealingly capping a plumbing system vent pipe, which extends upwardly from a roof of a building, during pressure testing of the plumbing system, and for opening the vent pipe, remotely from the ground, after pressure testing is completed to allow venting therethrough, comprising:

a) a capping member having a lower, generally-cylindrical tubular portion, with an outside diameter substantially the same as an inside diameter of the vent pipe, wherein, when the tubular portion is received within the vent pipe, a seal is formed therebetween, an upper portion for closing the vent pipe, said upper portion including a frangible neck, and means for maintaining said capping member at a desired axial location with respect to an upper end of the vent pipe; and b) means for fracturing said frangible neck of said capping member upper portion from a location on the ground remote from the immediate proximity of the vent pipe.

2. Apparatus in accordance with claim 1 wherein said means for maintaining said capping member at a desired axial location with respect to an upper end of the vent pipe comprises a generally annular flange extending generally perpendicular to a longitudinal axis of said capping member lower tubular portion, said flange defining a shoulder which faces downward and axially engages an upper extremity of the vent pipe to seat said capping member on the vent pipe.

3. Apparatus in accordance with claim 1 wherein said frangible neck has, formed therein, a circumferentially-extending groove defining a location at which said frangible neck portion fractures when force is applied, from a remote location, to said upper portion of said capping member.

4. Apparatus in accordance with claim 3 wherein said means for fracturing said frangible neck from a location on the ground comprises an elongated handle having a length sufficient for a person standing on the ground, holding a proximal end of the handle, to engage a remote end of the handle against said capping member.

5. Apparatus in accordance with claim 4 further comprising:

a) means carried by said upper portion of said capping member to facilitate capture of said upper portion of said capping member by means carried by said handle at said remote end thereof; and b) means carried by said handle, at said remote end thereof, for capturing said upper portion of said capping member.

6. Apparatus in accordance with claim 5 wherein said means carried by said upper portion of said capping member to facilitate capture of said upper portion of said capping member comprises an annular groove formed about said upper portion of said capping member, and wherein said capturing means carried by said remote end of said handle comprises a flaccid loop sized to be received within said groove.

7. Apparatus in accordance with claim 6 wherein said upper portion of said capping member includes a domed surface, and wherein said annular groove is formed within said domed surface.

8. Apparatus in accordance with claim 5 wherein said means carried by said upper portion of said capping member to facilitate capture of said upper portion of said capping member comprises an eye, and wherein said capturing means carried by said remote end of said handle comprises a hook carried at said remote end of said handle.

9. Apparatus in accordance with claim 4 wherein the length of said handle can be varied.

* * * * *